(12) United States Patent
Yang et al.

(10) Patent No.: US 10,673,670 B2
(45) Date of Patent: Jun. 2, 2020

(54) DEMODULATION REFERENCE SIGNAL TRANSMISSION APPARATUS, SYSTEM, AND METHOD

(71) Applicant: HUAWEI TECHNOLOGIES CO., LTD., Shenzhen, Guangdong (CN)

(72) Inventors: Xiaodong Yang, Shenzhen (CN); Wei Quan, Beijing (CN); Bingzhao Li, Beijing (CN); Zhenxing Hu, Shenzhen (CN); Jian Zhang, Beijing (CN); Jinhua Miao, Beijing (CN); Chuanfeng He, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 15/637,277

(22) Filed: Jun. 29, 2017

(65) Prior Publication Data

US 2017/0302491 A1 Oct. 19, 2017

Related U.S. Application Data

(63) Continuation of application No. PCT/CN2015/098395, filed on Dec. 23, 2015.

(30) Foreign Application Priority Data

Dec. 30, 2014 (CN) ............................ 2014 1 0850027

(51) Int. Cl.
*H04L 27/26* (2006.01)
*H04L 5/00* (2006.01)
(Continued)

(52) U.S. Cl.
CPC ........ *H04L 27/2649* (2013.01); *H04L 5/0007* (2013.01); *H04L 25/02* (2013.01);
(Continued)

(58) Field of Classification Search
CPC . H04L 27/26; H04L 25/02; H04L 5/00; H04L 5/0007; H04L 27/2602;
(Continued)

(56) References Cited

U.S. PATENT DOCUMENTS

2006/0287921 A1* 12/2006 Defries .................. G06Q 30/02
  705/14.5
2011/0103520 A1* 5/2011 Molnar ............... H04L 27/2649
  375/340
(Continued)

FOREIGN PATENT DOCUMENTS

CN 102332970 A 1/2012
CN 103166880 A 6/2013
(Continued)

OTHER PUBLICATIONS

International Search Report dated Mar. 11, 2016 in corresponding International Application No. PCT/CN2015/098395.
(Continued)

*Primary Examiner* — Kyaw Z Soe
(74) *Attorney, Agent, or Firm* — Leydig, Voit & Mayer, Ltd.

(57) ABSTRACT

The present invention provides a demodulation reference signal transmission apparatus, system, and method. The method includes: sending, by a base station, a configuration indication to user equipment UE, where the configuration indication is used to instruct the UE to send an independent DMRS and/or instruct the UE to send a combination of a DMRS and uplink data; and subsequently receiving, by the base station, the independent DMRS sent by the UE; and/or receiving the combination of the DMRS and the uplink data sent by the UE. In this way, the base station can trigger the
(Continued)

---

User equipment UE receives a configuration indication sent by a base station, where the configuration indication is used to instruct the UE to send an independent DMRS and/or instruct the UE to send a combination of the DMRS and uplink data — 200

The UE replaces, according to a mapping indication, at least one piece of uplink data with at least one DMRS and maps the at least one piece of uplink data to another frequency-time resource location — 202

The UE sends the independent DMRS to the base station according to the configuration indication; and/or the UE sends the combination of the DMRS and the uplink data to the base station according to the configuration indication — 201

UE to send the foregoing DMRS to complete frequency offset estimation, thereby improving accuracy of the frequency offset estimation.

13 Claims, 5 Drawing Sheets

(51) Int. Cl.
  *H04L 25/02* (2006.01)
  *H04W 72/12* (2009.01)
(52) U.S. Cl.
  CPC ....... *H04L 27/2602* (2013.01); *H04W 72/121* (2013.01); *H04W 72/1294* (2013.01)
(58) Field of Classification Search
  CPC .. H04L 5/0051; H04L 27/2649; H04W 72/12; H04W 72/121; H04W 72/1294
  See application file for complete search history.

(56) References Cited

U.S. PATENT DOCUMENTS

| | | | | |
|---|---|---|---|---|
| 2012/0051319 | A1* | 3/2012 | Kwon | H04W 72/0406 370/329 |
| 2013/0022087 | A1* | 1/2013 | Chen | H04L 5/0051 375/147 |
| 2014/0112287 | A1 | 4/2014 | Chun et al. | |

FOREIGN PATENT DOCUMENTS

| | | |
|---|---|---|
| CN | 103944665 A | 7/2014 |
| WO | 2010/134755 A2 | 11/2010 |
| WO | 2013/086946 A1 | 6/2013 |
| WO | 2014/110928 A1 | 7/2014 |

OTHER PUBLICATIONS

Extended European Search Report dated Nov. 21, 2017 in corresponding European Patent Application No. 15875150.3.
Huawei: "Sounding capacity enhancement using DMRS," 3GPP Draft; R1-101970 Sounding Capacity Enhancement using DMRS, $3^{rd}$ Generation Partnership Project (3GPP), Mobile Competence Centre; 650, Route Des Lucioles; F-06921 Sophia-Antipolis Cedex; France, vol. RAN WG1, No. Beijing, China; Apr. 6, 2010, XP050419309.
Panasonic: "Uplink enhancement for Rel.11," 3GPP Draft; R1-112367 Uplink enhancement for Ref-11, $3^{rd}$ Generation Partnership Project (3GPP), Mobile Competence Centre; 650 Route Des Lucioles; F-06921 Sophi-Antipolis Cedex; France, vol. RAN WG1, No. Athens, Greece, Aug. 16, 2011, XP050537495.
Texas Instruments: "Doppler Impact of Higher Carrier Frequencies on LTE—A Uplink," 3gpp draft; R1-090283 High Doppler, $3^{rd}$ Generation Partnership Project (3GPP), Mobile Competence Centre; 650, Route Des Lucioles; F-06921 Sophia-Antipolis Cedex; France, No. Ljubljana; Jan. 7, 2009, XP050318207.
Samsung: "Summary of Reflector Discussions on EUTRA UL RS," 3GPP Draft; R1-080020 UL RS Summary, $3^{rd}$ Generation Partnership Project (3GPP), Mobile Competence Centre; 650 Route Des Lucioles; F-06921 Sophia-Antipolis Cedex; France, vol. RAN WG1, No. Sevilla, Spain; Jan. 19, 2008, XP050596613.
Chinese Office Action dated Jul. 20, 2018, in corresponding Chinese Patent Application No. 201410850027.X, 10 pgs.
International Search Report dated Mar. 11, 2016 in corresponding International Patent Application No. PCT/CN2015/098395.
"$3^{rd}$ Generation Partnership Project; Technical Specification Group Radio Access Network; Evolved Universal Terrestrial Radio Access (E-UTRA); Physical channels and modulation (Release 12)," 3GPP TS 36.211, V12.3.0, Sep. 2014.

\* cited by examiner

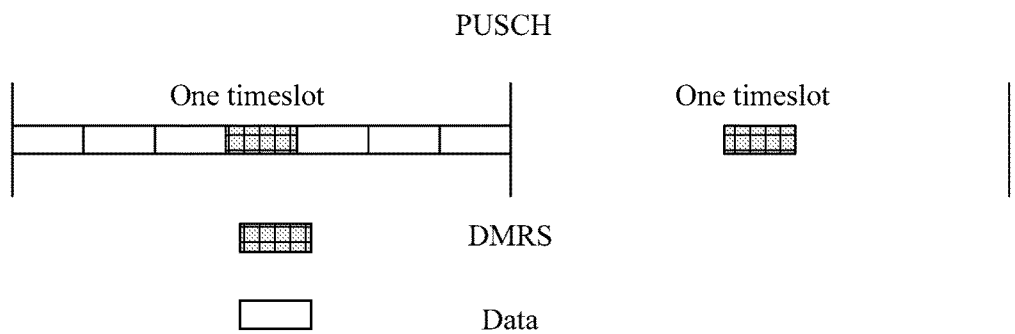

PUSCH

FIG. 12

One timeslot

FIG. 13

| User equipment UE receives a configuration indication sent by a base station, where the configuration indication is used to instruct the UE to send an independent DMRS and/or instruct the UE to send a combination of the DMRS and uplink data | 200 |

| The UE sends the independent DMRS to the base station according to the configuration indication; and/or the UE sends the combination of the DMRS and the uplink data to the base station according to the configuration indication | 201 |

FIG. 14

DEMODULATION REFERENCE SIGNAL TRANSMISSION APPARATUS, SYSTEM, AND METHOD

CROSS-REFERENCE TO RELATED APPLICATIONS

This application is a continuation of International Application No. PCT/CN2015/098395, filed on Dec. 23, 2015, which claims priority to Chinese Patent Application No. 201410850027.X, filed on Dec. 30, 2014, The disclosures of the aforementioned applications are hereby incorporated by reference in their entireties.

TECHNICAL FIELD

The present invention relates to the field of wireless communications technologies, and in particular, to a demodulation reference signal transmission apparatus, system, and method.

BACKGROUND

In an existing Long Term Evolution (LTE for short) system, a length of a subframe is 1 ms, and a length of a transmission time interval (TTI for short) is set to 1 ms. All scheduling in the LTE system is performed by using the TTI as a minimum scheduling unit. Currently, to make a data transmission delay shorter, a scenario in which the length of the TTI is set to 0.5 ms or less than 0.5 ms is proposed, to shorten a round trip time (RTT for short), so as to shorten a data transmission delay. FIG. 1 to FIG. 4 are schematic sending diagrams of some physical channels in frequency division duplex (FDD for short) of an LTE system in the prior art. Referring to FIG. 1, an uplink and a downlink are borne on different carriers, a physical downlink control channel (PDCCH for short) schedules transmission on a physical downlink shared channel (PDSCH for short) and a physical uplink shared channel (PUSCH for short). A physical uplink control channel (PUCCH for short) may be configured to bear feedback information of the PDSCH, that is, a network is notified of whether UE correctly receives data borne on the PDSCH. A physical HARQ indicator channel (PHICH for short) is configured to bear feedback information of the PUSCH, that is, the network notifies the user equipment (UE for short) of whether information sent by the PUSCH is correctly received. A relationship between a channel data part and a demodulation reference signal (DMRS for short) of the PUSCH is shown in FIG. 2. A relationship between a channel data part and a DMRS of the PUCCH is shown in FIG. 3.

However, when an existing DMRS transmission mechanism is applied to some scenarios, the mechanism cannot meet a requirement for performing frequency offset estimation by a base station. For example, when sending is performed by using a TTI whose length is 0.5 ms or less than 0.5 ms, the PUSCH is shortened to one timeslot, (while currently, one PUSCH generally has two timeslots) and an original timeslot structure of the PUSCH remains unchanged. Referring to FIG. 4, in this case, only a DMRS of one symbol is left in one timeslot in the prior art. However, when the frequency offset estimation is performed, DMRSs of at least two symbols are required to ensure accuracy of the frequency offset estimation. Therefore, in the prior art, when sending is performed by using a TTI whose length is 0.5 ms or less than 0.5 ms, accuracy of frequency offset estimation is reduced. For another example, when a high-speed railway user uses an existing LTE technology, a high speed causes a relatively large Doppler shift. However, the base station is based on the existing DMRS transmission mechanism in which a high-speed movement factor is not considered, so that accuracy of the frequency offset estimation is reduced.

To sum up, by means of the existing DMRS transmission mechanism, accuracy of the frequency offset estimation performed by the base station is reduced.

SUMMARY

The present invention provides a demodulation reference signal transmission apparatus, system, and method, to improve accuracy of frequency offset estimation.

A first aspect of the present invention provides a demodulation reference signal transmission apparatus, including:

a sending module, configured to send a configuration indication to user equipment UE, where the configuration indication is used to instruct the UE to send an independent demodulation reference signal DMRS and/or instruct the UE to send a combination of a DMRS and uplink data; and a receiving module, configured to receive the independent DMRS sent by the UE; and/or receive the combination of the DMRS and the uplink data sent by the UE.

With reference to the first aspect, in a first feasible implementation manner, the method further includes:

a processing module, configured to: before the sending module sends the configuration indication to the user equipment UE, determine whether a transmission time interval is less than or equal to a time threshold.

With reference to the first aspect or the first feasible implementation manner of the first aspect, in a second feasible implementation manner, the combination of the DMRS and the uplink data includes at least one DMRS and at least one piece of uplink data, where the at least one piece of uplink data is located within a timeslot of a physical uplink shared channel PUSCH.

With reference to the second feasible implementation manner of the first aspect, in a third feasible implementation manner, the configuration indication further includes sending location information of the independent DMRS and/or sending location information of the combination of the DMRS and the uplink data.

With reference to the third feasible implementation manner of the first aspect, in a fourth feasible implementation manner, the sending location information of the independent DMRS is used to indicate that a time domain location of the independent DMRS is located before the timeslot of the PUSCH, or indicate that a time domain location of the independent DMRS is located after the timeslot of the PUSCH; and the sending location information of the combination of the DMRS and the uplink data is used to indicate that a time domain location of the at least one DMRS is located before the timeslot of the PUSCH, or indicate that a time domain location of the at least one DMRS is located after the timeslot of the PUSCH, or indicate that a time domain location of the at least one DMRS is located within the timeslot of the PUSCH.

With reference to the second feasible implementation manner of the first aspect or the third feasible implementation manner of the first aspect or the fourth feasible implementation manner of the first aspect, in a fifth feasible implementation manner, when the time domain location of the at least one DMRS is located before the timeslot of the PUSCH or when the time domain location of the at least one DMRS is located after the timeslot of the PUSCH, a timeslot in which the at least one DMRS is located is used to transmit only the at least one DMRS.

With reference to the first aspect or any one of the foregoing feasible implementation manners of the first aspect, in a sixth feasible implementation manner, a timeslot in which the independent DMRS is located is used to transmit only the independent DMRS.

With reference to the second feasible implementation manner of the first aspect or the third feasible implementation manner of the first aspect or the fourth feasible implementation manner of the first aspect or the fifth feasible implementation manner of the first aspect, in a seventh feasible implementation manner, when the sending location information of the combination of the DMRS and the uplink data is used to indicate that the time domain location of the at least one DMRS is located within the timeslot of the PUSCH, the configuration indication further includes a mapping indication, where the mapping indication is used to instruct the UE to replace the at least one piece of uplink data with the at least one DMRS and map the at least one piece of uplink data to another frequency-time resource location.

With reference to the first aspect or any one of the foregoing feasible implementation manners of the first aspect, in an eighth feasible implementation manner, the configuration indication is a downlink control information DCI indication of a PDCCH, or a Media Access Control control element MAC CE indication, or a radio resource control RRC signaling indication.

A second aspect of the present invention provides a demodulation reference signal transmission apparatus, including:

a receiving module, configured to receive a configuration indication sent by a base station, where the configuration indication is used to instruct UE to send an independent demodulation reference signal DMRS and/or instruct the UE to send a combination of a DMRS and uplink data; and a sending module, configured to send the independent DMRS to the base station according to the configuration indication; and/or send the combination of the DMRS and the uplink data to the base station according to the configuration indication.

With reference to the second aspect, in a first feasible implementation manner, the combination of the DMRS and the uplink data includes at least one DMRS and at least one piece of uplink data, where the at least one piece of uplink data is located within a timeslot of a physical uplink shared channel PUSCH.

With reference to the second aspect or the first feasible implementation manner of the second aspect, in a second feasible implementation manner, the configuration indication further includes sending location information of the independent DMRS and/or sending location information of the combination of the DMRS and the uplink data.

With reference to the second feasible implementation manner of the second aspect, in a third feasible implementation manner, the sending location information of the independent DMRS is used to indicate that a time domain location of the independent DMRS is located before the timeslot of the PUSCH, or indicate that a time domain location of the independent DMRS is located after the timeslot of the PUSCH; and the sending location information of the combination of the DMRS and the uplink data is used to indicate that a time domain location of the at least one DMRS is located before the timeslot of the PUSCH, or indicate that a time domain location of the at least one DMRS is located after the timeslot of the PUSCH, or indicate that a time domain location of the at least one DMRS is located within the timeslot of the PUSCH.

With reference to the third feasible implementation manner of the second aspect, in a fourth feasible implementation manner, the apparatus further includes:

a processing module, configured to: before the sending module sends the combination of the DMRS and the uplink data to the base station according to the configuration indication, replace, according to a mapping indication, the at least one piece of uplink data with the at least one DMRS and map the at least one piece of uplink data to another frequency-time resource location, where when the sending location information of the combination of the DMRS and the uplink data is used to indicate that the time domain location of the at least one DMRS is located within the timeslot of the PUSCH, the configuration indication further includes the mapping indication.

With reference to the second aspect or any one of the foregoing feasible implementation manners of the second aspect, in a fifth feasible implementation manner, the configuration indication is a downlink control information DCI indication of a PDCCH, or a Media Access Control control element MAC CE indication, or a radio resource control RRC signaling indication.

A third aspect of the present invention provides a demodulation reference signal transmission system, including: at least one demodulation reference signal transmission apparatus according to the first aspect or any feasible implementation manner of the first aspect and at least one demodulation reference signal transmission apparatus according to the second aspect or any feasible implementation manner of the second aspect.

A fourth aspect of the present invention provides a demodulation reference signal transmission apparatus, including:

a transmitter, configured to send a configuration indication to user equipment UE, where the configuration indication is used to instruct the UE to send an independent demodulation reference signal DMRS and/or instruct the UE to send a combination of a DMRS and uplink data; and a receiver, configured to receive the independent DMRS sent by the UE; and/or receive the combination of the DMRS and the uplink data sent by the UE.

With reference to the fourth aspect, in a first feasible implementation manner, the apparatus further includes:

a processor, configured to: before the transmitter sends the configuration indication to the user equipment UE, determine whether a transmission time interval is less than or equal to a time threshold.

With reference to the fourth aspect or the first feasible implementation manner of the fourth aspect, in a second feasible implementation manner, the combination of the DMRS and the uplink data includes at least one DMRS and at least one piece of uplink data, where the at least one piece of uplink data is located within a timeslot of a physical uplink shared channel PUSCH.

With reference to the second feasible implementation manner of the fourth aspect, in a third feasible implementation manner, the configuration indication further includes sending location information of the independent DMRS and/or sending location information of the combination of the DMRS and the uplink data.

With reference to the third feasible implementation manner of the fourth aspect, in a fourth feasible implementation manner, the sending location information of the independent DMRS is used to indicate that a time domain location of the independent DMRS is located before the timeslot of the PUSCH, or indicate that a time domain location of the independent DMRS is located after the timeslot of the PUSCH; and the sending location information of the combination of the DMRS and the uplink data is used to indicate that a time domain location of the at least one DMRS is located before the timeslot of the PUSCH, or indicate that a time domain location of the at least one DMRS is located after the timeslot of the PUSCH, or indicate that a time domain location of the at least one DMRS is located within the timeslot of the PUSCH.

With reference to the second feasible implementation manner of the fourth aspect or the third feasible implementation manner of the fourth aspect or the fourth feasible implementation manner of the fourth aspect, in a fifth feasible implementation manner, when the time domain location of the at least one DMRS is located before the timeslot of the PUSCH or when the time domain location of the at least one DMRS is located after the timeslot of the PUSCH, a timeslot in which the at least one DMRS is located is used to transmit only the at least one DMRS.

With reference to the fourth aspect or any one of the foregoing feasible implementation manners of the fourth aspect, in a sixth feasible implementation manner, a timeslot in which the independent DMRS is located is used to transmit only the independent DMRS.

With reference to the second feasible implementation manner of the fourth aspect or the third feasible implementation manner of the fourth aspect or the fourth feasible implementation manner of the fourth aspect or the fifth feasible implementation manner of the fourth aspect, in a seventh feasible implementation manner, when the sending location information of the combination of the DMRS and the uplink data is used to indicate that the time domain location of the at least one DMRS is located within the timeslot of the PUSCH, the configuration indication further includes a mapping indication, where the mapping indication is used to instruct the UE to replace the at least one piece of uplink data with the at least one DMRS and map the at least one piece of uplink data to another frequency-time resource location.

With reference to the fourth aspect or any one of the foregoing feasible implementation manners of the fourth aspect, in an eighth feasible implementation manner, the configuration indication is a downlink control information DCI indication of a PDCCH, or a Media Access Control control element MAC CE indication, or a radio resource control RRC signaling indication.

A fifth aspect of the present invention provides a demodulation reference signal transmission apparatus, including:

a receiver, configured to receive a configuration indication sent by a base station, where the configuration indication is used to instruct UE to send an independent demodulation reference signal DMRS and/or instruct the UE to send a combination of a DMRS and uplink data; and a transmitter, configured to send the independent DMRS to the base station according to the configuration indication; and/or send the combination of the DMRS and the uplink data to the base station according to the configuration indication.

With reference to the fifth aspect, in a first feasible implementation manner, the combination of the DMRS and the uplink data includes at least one DMRS and at least one piece of uplink data, where the at least one piece of uplink data is located within a timeslot of a physical uplink shared channel PUSCH.

With reference to the fifth aspect or the first feasible implementation manner of the fifth aspect, in a second feasible implementation manner, the configuration indication further includes sending location information of the independent DMRS and/or sending location information of the combination of the DMRS and the uplink data.

With reference to the second feasible implementation manner of the fifth aspect, in a third feasible implementation manner, the sending location information of the independent DMRS is used to indicate that a time domain location of the independent DMRS is located before the timeslot of the PUSCH, or indicate that a time domain location of the independent DMRS is located after the timeslot of the PUSCH; and the sending location information of the combination of the DMRS and the uplink data is used to indicate that a time domain location of the at least one DMRS is located before the timeslot of the PUSCH, or indicate that a time domain location of the at least one DMRS is located after the timeslot of the PUSCH, or indicate that a time domain location of the at least one DMRS is located within the timeslot of the PUSCH.

With reference to the third feasible implementation manner of the fifth aspect, in a fourth feasible implementation manner, the apparatus further includes:

a processor, configured to: before the transmitter sends the combination of the DMRS and the uplink data to the base station according to the configuration indication, replace, according to a mapping indication, the at least one piece of uplink data with the at least one DMRS and map the at least one piece of uplink data to another frequency-time resource location, where when the sending location information of the combination of the DMRS and the uplink data is used to indicate that the time domain location of the at least one DMRS is located within the timeslot of the PUSCH, the configuration indication further includes the mapping indication.

With reference to the fifth aspect or any one of the foregoing feasible implementation manners of the fifth aspect, in a fifth feasible implementation manner, the configuration indication is a downlink control information DCI indication of a PDCCH, or a Media Access Control control element MAC CE indication, or a radio resource control RRC signaling indication.

A sixth aspect of the present invention provides a demodulation reference signal transmission method, including:

sending, by a base station, a configuration indication to user equipment UE, where the configuration indication is used to instruct the UE to send an independent demodulation reference signal DMRS and/or instruct the UE to send a combination of a DMRS and uplink data; and receiving, by the base station, the independent DMRS sent by the UE; and/or receiving the combination of the DMRS and the uplink data sent by the UE.

With reference to the sixth aspect, in a first feasible implementation manner, before the sending, by a base station, a configuration indication to user equipment UE, the method further includes:

determining, by the base station, whether a transmission time interval is less than or equal to a time threshold.

With reference to the sixth aspect or the first feasible implementation manner of the sixth aspect, in a second feasible implementation manner, the combination of the DMRS and the uplink data includes at least one DMRS and at least one piece of uplink data, where the at least one piece of uplink data is located within a timeslot of a PUSCH.

With reference to the second feasible implementation manner of the sixth aspect, in a third feasible implementation manner, the configuration indication further includes sending location information of the independent DMRS and/or sending location information of the combination of the DMRS and the uplink data.

With reference to the third feasible implementation manner of the sixth aspect, in a fourth feasible implementation manner, the sending location information of the independent DMRS is used to indicate that a time domain location of the independent DMRS is located before the timeslot of the PUSCH, or indicate that a time domain location of the independent DMRS is located after the timeslot of the PUSCH; and the sending location information of the combination of the DMRS and the uplink data is used to indicate that a time domain location of the at least one DMRS is located before the timeslot of the PUSCH, or indicate that a time domain location of the at least one DMRS is located after the timeslot of the PUSCH, or indicate that a time domain location of the at least one DMRS is located within the timeslot of the PUSCH.

With reference to the second feasible implementation manner of the sixth aspect or the third feasible implementation manner of the sixth aspect or the fourth feasible implementation manner of the sixth aspect, in a fifth feasible implementation manner, when the time domain location of the at least one DMRS is located before the timeslot of the PUSCH or when the time domain location of the at least one DMRS is located after the timeslot of the PUSCH, a timeslot in which the at least one DMRS is located is used to transmit only the at least one DMRS.

With reference to the sixth aspect or any one of the foregoing feasible implementation manners of the sixth aspect, in a sixth feasible implementation manner, a timeslot in which the independent DMRS is located is used to transmit only the independent DMRS.

With reference to the second feasible implementation manner of the sixth aspect or the third feasible implementation manner of the sixth aspect or the fourth feasible implementation manner of the sixth aspect or the fifth feasible implementation manner of the sixth aspect, in a seventh feasible implementation manner, when the sending location information of the combination of the DMRS and the uplink data is used to indicate that the time domain location of the at least one DMRS is located within the timeslot of the PUSCH, the configuration indication further includes a mapping indication, where the mapping indication is used to instruct the UE to replace the at least one piece of uplink data with the at least one DMRS and map the at least one piece of uplink data to another frequency-time resource location.

With reference to the sixth aspect or any one of the foregoing feasible implementation manners of the sixth aspect, in an eighth feasible implementation manner, the configuration indication is a downlink control information DCI indication of a PDCCH, or a Media Access Control control element MAC CE indication, or a radio resource control RRC signaling indication.

A seventh aspect of the present invention provides a demodulation reference signal transmission method, including:

receiving, by user equipment UE, a configuration indication sent by a base station, where the configuration indication is used to instruct the UE to send an independent demodulation reference signal DMRS and/or instruct the UE to send a combination of a DMRS and uplink data; and sending, by the UE, the independent DMRS to the base station according to the configuration indication; and/or sending, by the UE, the combination of the DMRS and the uplink data to the base station according to the configuration indication.

With reference to the seventh aspect, in a first feasible implementation manner, the combination of the DMRS and the uplink data includes at least one DMRS and at least one piece of uplink data, where the at least one piece of uplink data is located within a timeslot of a physical uplink shared channel PUSCH.

With reference to the seventh aspect or the first feasible implementation manner of the seventh aspect, in a second feasible implementation manner, the configuration indication further includes sending location information of the independent DMRS and/or sending location information of the combination of the DMRS and the uplink data.

With reference to the second feasible implementation manner of the seventh aspect, in a third feasible implementation manner, the sending location information of the independent DMRS is used to indicate that a time domain location of the independent DMRS is located before the timeslot of the PUSCH, or indicate that a time domain location of the independent DMRS is located after the timeslot of the PUSCH; and the sending location information of the combination of the DMRS and the uplink data is used to indicate that a time domain location of the at least one DMRS is located before the timeslot of the PUSCH, or indicate that a time domain location of the at least one DMRS is located after the timeslot of the PUSCH, or indicate that a time domain location of the at least one DMRS is located within the timeslot of the PUSCH.

With reference to the third feasible implementation manner of the seventh aspect, in a fourth feasible implementation manner, when the sending location information of the combination of the DMRS and the uplink data is used to indicate that the time domain location of the at least one DMRS is located within the timeslot of the PUSCH, the configuration indication further includes a mapping indication, and before the sending, by the UE, the combination of the DMRS and the uplink data to the base station according to the configuration indication, the method further includes:

replacing, by the UE according to the mapping indication, the at least one piece of uplink data with the at least one DMRS and mapping the at least one piece of uplink data to another frequency-time resource location.

With reference to the seventh aspect or any one of the foregoing feasible implementation manners of the seventh aspect, in a fifth feasible implementation manner, the configuration indication is a downlink control information DCI indication of a PDCCH, or a Media Access Control control element MAC CE indication, or a radio resource control RRC signaling indication.

In the apparatus, system, and demodulation reference signal transmission method provided in embodiments of the present invention, a base station sends a configuration indication to user equipment UE, where the configuration indication is used to instruct the UE to send an independent DMRS and/or instruct the UE to send a combination of a DMRS and uplink data; and subsequently the base station receives the independent DMRS sent by the UE; and/or receives the combination of the DMRS and the uplink data sent by the UE. In this way, the base station can trigger the UE to send the foregoing DMRS to complete frequency offset estimation, thereby improving accuracy of the frequency offset estimation.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 12 is a schematic diagram of a time domain location of at least one DMRS;

FIG. 13 is a schematic diagram of a DMRS pattern according to an embodiment of the present invention;

FIG. 14 is a schematic flowchart of another demodulation reference signal transmission method according to an embodiment of the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

For the foregoing technical problem in the prior art, by means of a demodulation reference signal transmission apparatus, system, and method provided in the embodiments of the present invention, a DMRS is sent flexibly, so as to implement that the system can precisely estimate a frequency offset value in any scenario. The following describes the solutions of the present invention by using specific embodiments.

Figure 5:
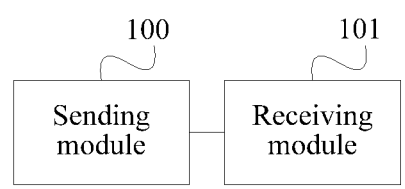
FIG. 5 is a schematic structural diagram of a demodulation reference signal transmission apparatus according to an embodiment of the present invention.

FIG. 5 is a schematic structural diagram of a demodulation reference signal transmission apparatus according to an embodiment of the present invention. The transmission apparatus is a base station or an evolved NodeB (eNB for short). Referring to FIG. 5, the transmission apparatus includes a sending module 100 and a receiving module 101, where the sending module 100 is configured to send a configuration indication to user equipment UE, where the configuration indication is used to instruct the UE to send an independent DMRS and/or instruct the UE to send a combination of a DMRS and uplink data; and the receiving module 101 is configured to receive the independent DMRS sent by the UE; and/or receive the combination of the DMRS and the uplink data sent by the UE.

In the demodulation reference signal transmission apparatus provided in this embodiment of the present invention, the sending module sends a configuration indication to the user equipment UE, where the configuration indication is used to instruct the UE to send an independent DMRS and/or instruct the UE to send a combination of a DMRS and uplink data; and subsequently, the receiving module receives the independent DMRS sent by the UE and/or receives the combination of the DMRS and the uplink data sent by the UE. In this way, the base station can trigger the UE to send the foregoing DMRS to complete frequency offset estimation, thereby improving accuracy of the frequency offset estimation.

In addition, when a high-speed railway user uses an existing LTE technology, because in an existing LTE system, there is no design corresponding to a high-speed movement scenario in which a speed reaches about 400 km/h or 500 km/h, a high speed causes a relatively large Doppler shift. Therefore, when a frequency offset is performed in the high-speed movement scenario by using the existing LTE technology, accuracy of the frequency offset is also decreased.

For a high-speed movement scenario such as a high-speed railway, before scheduling a PUSCH, the transmission apparatus triggers the UE to send one or more independent DMRSs, that is, instructs the UE to send at least one independent DMRS. After receiving the at least one independent DMRS, the base station performs frequency offset estimation first and then schedules the UE to perform transmission of the PUSCH. In this case, the base station may perform joint demodulation on the PUSCH according to a pre-estimated frequency offset and the DMRS in the PUSCH. Therefore, accuracy of the frequency offset estimation is improved, thereby ensuring accuracy of the demodulation on the PUSCH.

Figure 6:
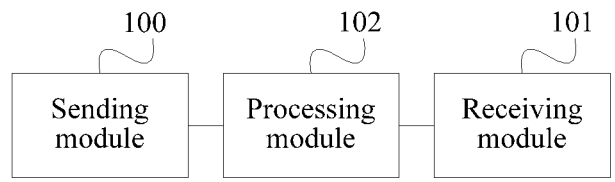
FIG. 6 is a schematic structural diagram of another demodulation reference signal transmission apparatus according to an embodiment of the present invention.

Based on FIG. 5, FIG. 6 is a schematic structural diagram of another demodulation reference signal transmission apparatus according to an embodiment of the present invention. Referring to FIG. 6, the transmission apparatus further includes a processing module 102, where the processing module 102 is configured to: before the sending module 100 sends the configuration indication to the user equipment UE, determine whether a transmission time interval is less than or equal to a time threshold.

Optionally, the combination of the DMRS and the uplink data includes at least one DMRS and at least one piece of uplink data, where the at least one piece of uplink data is located within a timeslot of the PUSCH.

Optionally, the configuration indication further includes sending location information of the independent DMRS and/or sending location information of the combination of the DMRS and the uplink data.

Further, the sending location information of the independent DMRS is used to indicate that a time domain location of the independent DMRS is located before the timeslot of the PUSCH, or indicate that a time domain location of the independent DMRS is located after the timeslot of the PUSCH; and the sending location information of the combination of the DMRS and the uplink data is used to indicate that a time domain location of the at least one DMRS is located before the timeslot of the PUSCH, or indicate that a time domain location of the at least one DMRS is located after the timeslot of the PUSCH, or indicate that a time domain location of the at least one DMRS is located within the timeslot of the PUSCH.

Optionally, when the time domain location of the at least one DMRS is located before the timeslot of the PUSCH or when the time domain location of the at least one DMRS is located after the timeslot of the PUSCH, a timeslot in which the at least one DMRS is located is used to transmit only the at least one DMRS.

Optionally, a timeslot in which the independent DMRS is located is used to transmit only the independent DMRS.

Optionally, when the sending location information of the combination of the DMRS and the uplink data is used to indicate that the time domain location of the at least one DMRS is located within the timeslot of the PUSCH, the configuration indication further includes a mapping indication, where the mapping indication is used to instruct the UE to replace the at least one piece of uplink data with the at least one DMRS and map the at least one piece of uplink data to another frequency-time resource location.

Optionally, the configuration indication is a DCI indication of a PDCCH, or a MAC CE indication, or an RRC signaling indication.

Figure 7:
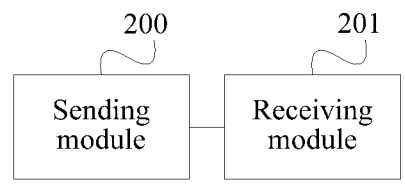
FIG. 7 is a schematic structural diagram of another demodulation reference signal transmission apparatus according to an embodiment of the present invention.

FIG. 7 is a schematic structural diagram of another demodulation reference signal transmission apparatus according to an embodiment of the present invention. The transmission apparatus is UE, and may be specifically a smartphone, a tablet computer, or the like. Referring to FIG. 7, the transmission apparatus includes a sending module 200 and a receiving module 201, where the receiving module 201 is configured to receive a configuration indication sent by a base station, where the configuration indication is used to instruct the UE to send an independent DMRS and/or instruct the UE to send a combination of a DMRS and uplink data; and the sending module 200 is configured to send the independent DMRS to the base station according to the configuration indication; and/or send the combination of the DMRS and the uplink data to the base station according to the configuration indication.

In the demodulation reference signal transmission apparatus provided in this embodiment of the present invention, the receiving module receives a configuration indication sent by the base station, where the configuration indication is used to instruct the UE to send an independent DMRS and/or instruct the UE to send a combination of a DMRS and uplink data; and then the sending module sends the independent DMRS to the base station according to the configuration indication and/or sends the combination of the DMRS and the uplink data to the base station according to the configuration indication, so as to implement that the base station triggers the UE to send the foregoing DMRS to complete frequency offset estimation, thereby improving accuracy of the frequency offset estimation.

In addition, when a high-speed railway user uses an existing LTE technology, because in an existing LTE system, there is no design corresponding to a high-speed movement scenario in which a speed reaches about 400 km/h or 500 km/h, a high speed causes a relatively large Doppler shift. Therefore, when a frequency offset is performed in the high-speed movement scenario by using the existing LTE technology, accuracy of the frequency offset is also decreased.

For a high-speed movement scenario such as a high-speed railway, in the solution shown in FIG. 7, before scheduling a PUSCH, the base station triggers the UE to send one or more independent DMRSs. After receiving at least one independent DMRS sent by the UE, the base station performs frequency offset estimation first and then schedules the UE to perform transmission of the PUSCH. In this case, the base station may perform joint demodulation on the PUSCH according to a pre-estimated frequency offset and the DMRS in the PUSCH. Therefore, accuracy of the frequency offset estimation is improved, thereby ensuring accuracy of the demodulation on the PUSCH.

Further, the combination of the DMRS and the uplink data includes at least one DMRS and at least one piece of uplink data, where the at least one piece of uplink data is located within a timeslot of the PUSCH.

Optionally, the configuration indication further includes sending location information of the independent DMRS and/or sending location information of the combination of the DMRS and the uplink data.

Further, the sending location information of the independent DMRS is used to indicate that a time domain location of the independent DMRS is located before the timeslot of the PUSCH, or indicate that a time domain location of the independent DMRS is located after the timeslot of the PUSCH; and the sending location information of the combination of the DMRS and the uplink data is used to indicate that a time domain location of the at least one DMRS is located before the timeslot of the PUSCH, or indicate that a time domain location of the at least one DMRS is located after the timeslot of the PUSCH, or indicate that a time domain location of the at least one DMRS is located within the timeslot of the PUSCH.

Figure 8:
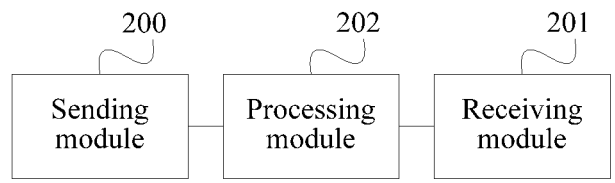
FIG. 8 is a schematic structural diagram of another demodulation reference signal transmission apparatus according to an embodiment of the present invention.

Further, based on FIG. 7, FIG. 8 is a schematic structural diagram of another demodulation reference signal transmission apparatus according to an embodiment of the present invention. Referring to FIG. 8, the transmission apparatus further includes a processing module 202, where when the sending location information of the combination of the DMRS and the uplink data is used to indicate that the time domain location of the at least one DMRS is located within the timeslot of the PUSCH, the configuration indication further includes a mapping indication.

In this case, the processing module 202 is configured to: before the sending module 200 sends the combination of the DMRS and the uplink data to the base station according to the configuration indication, replace, according to the mapping indication, the at least one piece of uplink data with the at least one DMRS and map the at least one piece of uplink data to another frequency-time resource location.

Optionally, the configuration indication is a DCI indication of a PDCCH, or a MAC CE indication, or an RRC signaling indication.

Figure 9:
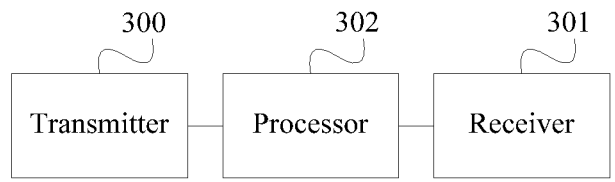
FIG. 9 is a schematic structural diagram of another universal transmission apparatus according to an embodiment of the present invention.

FIG. 9 is a schematic structural diagram of another universal transmission apparatus according to an embodiment of the present invention. Referring to FIG. 9, the universal transmission apparatus includes: a transmitter 300, a receiver 301, and a processor 302.

When the apparatus shown in FIG. 5 or FIG. 6 is used as the foregoing base station or eNB, the transmitter 300 can have corresponding functions of the foregoing sending module 100, the receiver 301 can have corresponding functions of the foregoing receiving module 101, and the processor 302 can have corresponding functions of the foregoing processing module 102, so that technical effects of the embodiment corresponding to FIG. 5 or FIG. 6 are achieved.

When the apparatus shown in FIG. 7 or FIG. 8 is used as the foregoing UE, the transmitter 300 can have corresponding functions of the foregoing sending module 200, the receiver 301 can have corresponding functions of the foregoing receiving module 201, and the processor 302 can have corresponding functions of the foregoing processing module 202, so that technical effects of the embodiment corresponding to FIG. 7 or FIG. 8 are achieved.

In addition, this embodiment of the present invention further provides a demodulation reference signal transmission system. The system may include at least one base station or eNB described above and at least one UE described above, where the apparatus shown in FIG. 5 or FIG. 6 or FIG. 9 is used as the base station or the eNB, and the apparatus shown in FIG. 7 or FIG. 8 or FIG. 9 is used as the UE.

Figure 10:
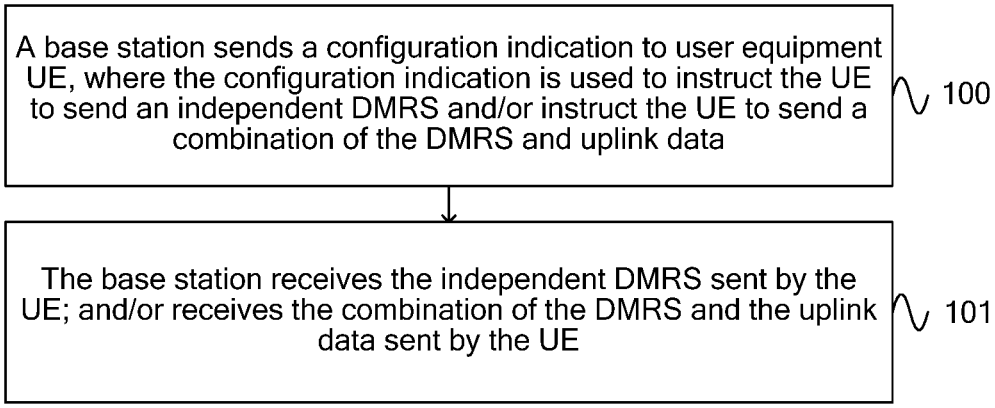
FIG. 10 is a schematic flowchart of a demodulation reference signal transmission method according to an embodiment of the present invention.

FIG. 10 is a schematic flowchart of a demodulation reference signal transmission method according to an embodiment of the present invention. An entity for executing the method is a base station, and certainly may also be an evolved NodeB (eNB for short). The base station or eNB may use the structure shown in FIG. 5 or FIG. 6 or FIG. 9 to perform the corresponding functions. Referring to FIG. 10, the method includes the following steps:

Step 100: The base station sends a configuration indication to user equipment UE, where the configuration indication is used to instruct the UE to send an independent DMRS and/or instruct the UE to send a combination of a DMRS and uplink data.

It should be noted that the independent DMRS refers to a DMRS that does not need to depend on the uplink data and that is independently sent by the UE.

Step 101: The base station receives the independent DMRS sent by the UE; and/or receives the combination of the DMRS and the uplink data sent by the UE.

In the demodulation reference signal transmission method provided in this embodiment of the present invention, a base station sends a configuration indication to user equipment UE, where the configuration indication is used to instruct the UE to send an independent DMRS and/or instruct the UE to send a combination of a DMRS and uplink data; and subsequently, the base station receives the independent DMRS sent by the UE; and/or receives the combination of the DMRS and the uplink data sent by the UE. In this way, the base station can trigger the UE to send the foregoing DMRS to complete frequency offset estimation, thereby improving accuracy of the frequency offset estimation.

In addition, when a high-speed railway user uses an existing LTE technology, because in an existing LTE system, there is no design corresponding to a high-speed movement scenario in which a speed reaches about 400 km/h or 500 km/h, a high speed causes a relatively large Doppler shift. Therefore, when a frequency offset is performed in the high-speed movement scenario by using the existing LTE technology, accuracy of the frequency offset is also decreased.

For a high-speed movement scenario such as a high-speed railway, in the solution shown in FIG. 10, before scheduling a PUSCH, the base station triggers the UE to send one or more independent DMRSs, that is, instructs the UE to send at least one independent DMRS. After receiving the at least one independent DMRS, the base station performs frequency offset estimation first and then schedules the UE to perform transmission of the PUSCH. In this case, the base station may perform joint demodulation on the PUSCH according to a pre-estimated frequency offset and the DMRS in the PUSCH. Therefore, accuracy of the frequency offset estimation is improved, thereby ensuring accuracy of the demodulation on the PUSCH.

Figure 1:
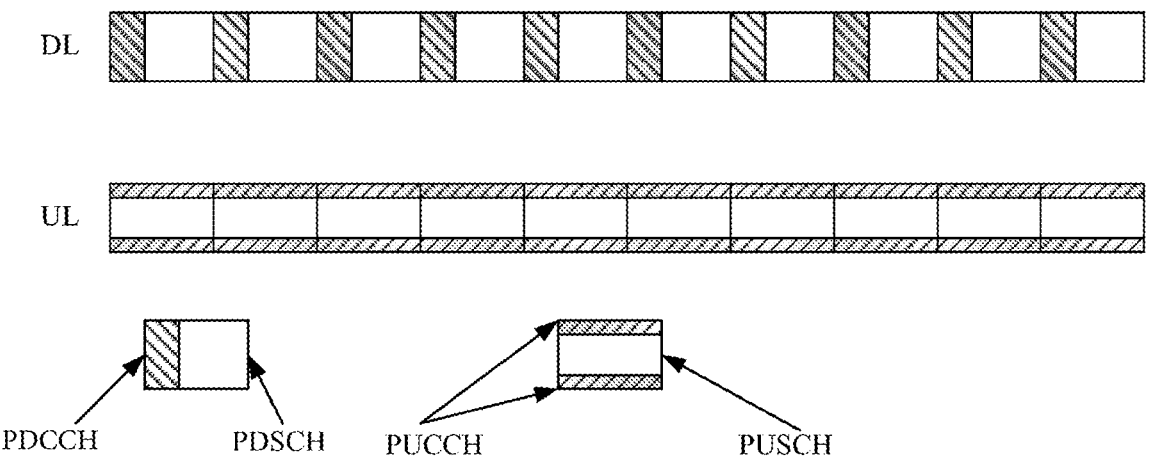
FIG. 1 to FIG. 4 are schematic sending diagrams of some physical channels in FDD of an LTE system in the prior art.
Figure 2:
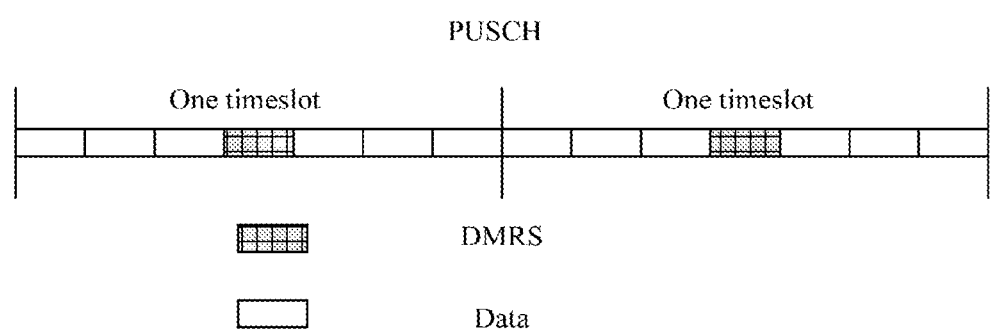
Figure 3:
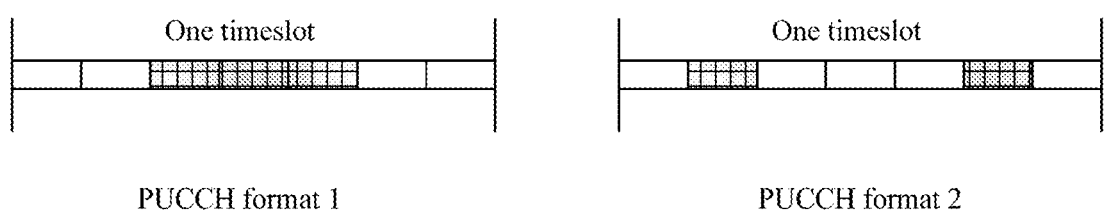
Figure 4:
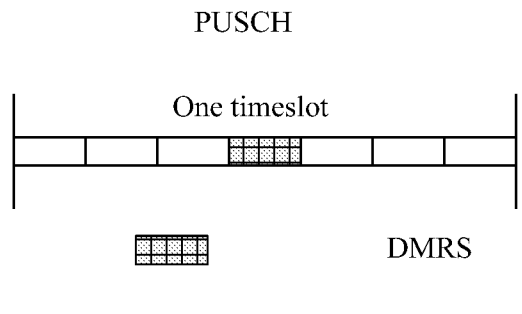
Figure 11:
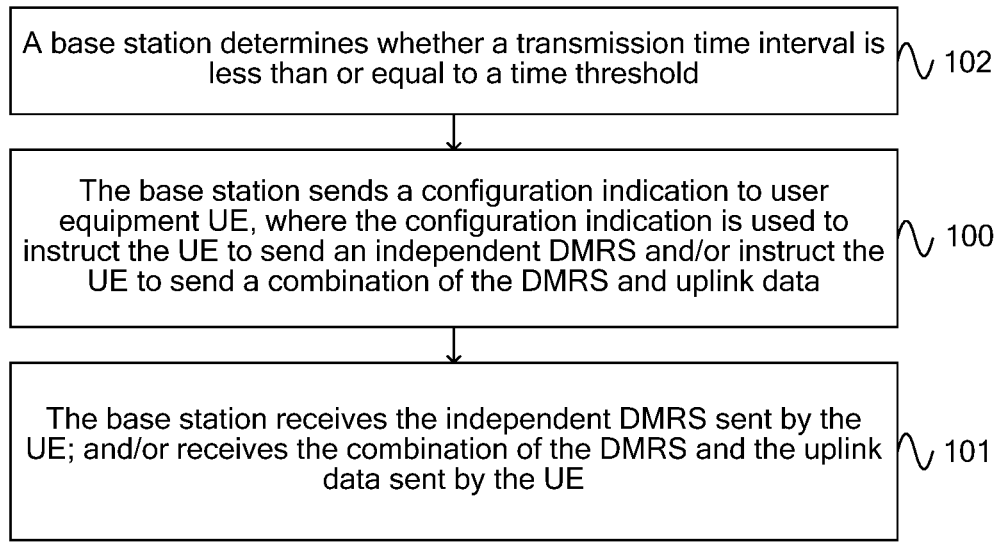
FIG. 11 is a schematic flowchart of another demodulation reference signal transmission method according to an embodiment of the present invention.

Further, when the sending is performed by using a TTI whose length is 0.5 ms or less than 0.5 ms, it may be known with reference to FIG. 4 that in the prior art, the PUSCH is shortened to one timeslot, (while currently, one PUSCH generally has two timeslots) and an original timeslot structure of the PUSCH remains unchanged. As a result, in the timeslot, only a DMRS of one symbol is left. However, when the frequency offset estimation is performed, DMRSs of at least two symbols are required to ensure accuracy of the frequency offset estimation. Therefore, for this scenario, a mechanism shown in FIG. 5 in which the base station triggers the UE to send the independent DMRS and/or send the combination of the DMRS and the uplink data may be used, so as to ensure accuracy of the frequency offset estimation. To determine when to trigger the solution shown in FIG. 10, preferably, based on FIG. 10, FIG. 11 is a schematic flowchart of another demodulation reference signal transmission method according to an embodiment of the present invention. Before step 100, the method may further include:

Step 102: The base station determines whether a transmission time interval is less than or equal to a time threshold.

The transmission time interval may be the foregoing TTI. For the foregoing scenario, the time threshold may be a value less than or equal to 0.5 ms. Certainly, for other similar scenarios, the transmission time interval and the time threshold may be set according to a system requirement. This is not limited in the present invention.

Further, for a case in which the DMRS is sent in dependence on the uplink data, the configuration indication is used to instruct the UE to send the combination of the DMRS and the uplink data, where the combination of the DMRS and the uplink data includes at least one DMRS and at least one piece of uplink data, where the at least one piece of uplink data is located within a timeslot of the PUSCH.

A concept of a DMRS may refer to a DMRS symbol occupying one time-frequency resource location, and a piece of uplink data refers to uplink data occupying one time-frequency resource location.

Optionally, the configuration indication may also be used to indicate a location in which the independent DMRS is located, and a location in which the combination of the DMRS and the uplink data is located. Specifically, a feasible implementation manner is that:

the configuration indication further includes sending location information of the independent DMRS and/or sending location information of the combination of the DMRS and the uplink data.

Further, for the sending location information of the independent DMRS, there may be the following several cases:

case 1: the sending location information of the independent DMRS is used to indicate that a time domain location of the independent DMRS is located before the timeslot of the PUSCH; and case 2: the sending location information of the independent DMRS is used to indicate that a time domain location of the independent DMRS is located after the timeslot of the PUSCH.

For the sending location information of the combination of the DMRS and the uplink data, there may be the following several cases:

case 1: the sending location information of the combination of the DMRS and the uplink data is used to indicate that a time domain location of the at least one DMRS is located before the timeslot of the PUSCH;

case 2: the sending location information of the combination of the DMRS and the uplink data is used to indicate that a time domain location of the at least one DMRS is located after the timeslot of the PUSCH; and case 3: the sending location information of the combination of the DMRS and the uplink data is used to indicate that a time domain location of the at least one DMRS is located within the timeslot of the PUSCH.

For the sending location information of the combination of the DMRS and the uplink data, the case 2 is used as an example. FIG. 12 is a schematic diagram of a time domain location of at least one DMRS. Referring to FIG. 12, a timeslot on a right side is uplink data and a DMRS that occupy one timeslot. On this basis, a DMRS is added according to the foregoing configuration indication, and the configuration indication indicates that a time domain location of the DMRS is located after the timeslot of the PUSCH.

Further, when the combination of the DMRS and the uplink data is sent, the base station performs cyclic shift on code of the DMRS of the combination. In the prior art, when the cyclic shift is performed on the code of the DMRS, only eight of 12 cyclic values are used and the rest four cyclic values are not used.

Therefore, at least one added DMRS in this embodiment of the present invention may use the foregoing four cyclic values that are not used. Certainly, the at least one added DMRS may also use the eight cyclic values that are previously used. This is not limited herein.

Optionally, for the independent DMRS, a timeslot in which the independent DMRS is located is used to transmit only the independent DMRS. For the combination of the DMRS and the uplink data, when the time domain location of the at least one DMRS is located before the timeslot of the PUSCH or when the time domain location of the at least one DMRS is located after the timeslot of the PUSCH, a timeslot in which the at least one DMRS is located is used to transmit only the at least one DMRS.

Optionally, the timeslot in which the independent DMRS is located or a timeslot in which the combination of the DMRS and the uplink data is located may also be used to transmit the uplink data. FIG. 13 is a schematic diagram of a DMRS pattern according to an embodiment of the present invention. Referring to FIG. 13, a feasible implementation manner is that: In a PRB, a DMRS does not occupy all 12 subcarriers of the PRB but occupies only six subcarriers, and each two pieces of data are separated by using a subcarrier, so that the rest PRB may be used to transmit the uplink data.

For the case 3 of the sending location information of the combination of the DMRS and the uplink data, a feasible implementation manner is that: the configuration indication further includes a mapping indication, where the mapping indication is used to instruct the UE to replace the at least one piece of uplink data with the at least one DMRS and map the at least one piece of uplink data to another frequency-time resource location.

Specifically, the UE only needs to give time-frequency resource locations of a part of the sent uplink data to the at least one DMRS for sending. However, the part of the uplink data may be mapped to other time-frequency resource locations, or the part of the uplink data is directly discarded to directly give the time-frequency resource locations to the at least one DMRS for sending.

Preferably, in the foregoing embodiments and the feasible implementation manners, the configuration indication is a DCI indication of a PDCCH, or a MAC CE indication, or an RRC signaling indication.

FIG. 14 is a schematic flowchart of another demodulation reference signal transmission method according to an embodiment of the present invention. An entity for executing the method is UE, and may be specifically a smartphone, a tablet computer, or the like. The UE may use the structure shown in FIG. 7 or FIG. 8 or FIG. 9 to implement the corresponding functions. Referring to FIG. 14, the method includes the following steps:

Step 200: The user equipment UE receives a configuration indication sent by a base station, where the configuration indication is used to instruct the UE to send an independent DMRS and/or instruct the UE to send a combination of a DMRS and uplink data.

Step 201: The UE sends the independent DMRS to the base station according to the configuration indication; and/or the UE sends the combination of the DMRS and the uplink data to the base station according to the configuration indication.

In the demodulation reference signal transmission method provided in this embodiment of the present invention, user equipment UE receives a configuration indication sent by a base station, where the configuration indication is used to instruct the UE to send an independent DMRS and/or instruct the UE to send a combination of a DMRS and uplink data; and then the UE sends the independent DMRS to the base station according to the configuration indication; and/or sends the combination of the DMRS and the uplink data to the base station according to the configuration indication, so as to implement that the base station triggers the UE to send the foregoing DMRS to complete frequency offset estimation, thereby improving accuracy of the frequency offset estimation.

In addition, when a high-speed railway user uses an existing LTE technology, because in an existing LTE system, there is no design corresponding to a high-speed movement scenario in which a speed reaches about 400 km/h or 500 km/h, a high speed causes a relatively large Doppler shift. Therefore, when a frequency offset is performed in the high-speed movement scenario by using the existing LTE technology, accuracy of the frequency offset is also decreased.

For a high-speed movement scenario such as a high-speed railway, in the solution shown in FIG. 14, before scheduling a PUSCH, the base station triggers the UE to send one or more independent DMRSs. After receiving at least one independent DMRS sent by the UE, the base station performs frequency offset estimation first and then schedules the UE to perform transmission of the PUSCH. In this case, the base station may perform joint demodulation on the PUSCH according to a pre-estimated frequency offset and the DMRS in the PUSCH. Therefore, accuracy of the frequency offset estimation is improved, thereby ensuring accuracy of the demodulation on the PUSCH.

Further, the combination of the DMRS and the uplink data includes at least one DMRS and at least one piece of uplink data, where the at least one piece of uplink data is located within a timeslot of the PUSCH.

A concept of a DMRS may refer to a DMRS symbol occupying one time-frequency resource location, and a piece of uplink data refers to uplink data occupying one time-frequency resource location.

Optionally, the configuration indication may also be used to indicate a location in which the independent DMRS is located, and a location in which the combination of the DMRS and the uplink data is located. Specifically, a feasible implementation manner is that:

the configuration indication further includes sending location information of the independent DMRS and/or sending location information of the combination of the DMRS and the uplink data.

Further, for the sending location information of the independent DMRS, there may be the following several cases:

case 1: the sending location information of the independent DMRS is used to indicate that a time domain location of the independent DMRS is located before the timeslot of the PUSCH; and case 2: the sending location information of the independent DMRS is used to indicate that a time domain location of the independent DMRS is located after the timeslot of the PUSCH.

For the sending location information of the combination of the DMRS and the uplink data, there may be the following several cases:

case 1: the sending location information of the combination of the DMRS and the uplink data is used to indicate that a time domain location of the at least one DMRS is located before the timeslot of the PUSCH;

case 2: the sending location information of the combination of the DMRS and the uplink data is used to indicate that a time domain location of the at least one DMRS is located after the timeslot of the PUSCH; and case 3: the sending location information of the combination of the DMRS and the uplink data is used to indicate that a time domain location of the at least one DMRS is located within the timeslot of the PUSCH.

Optionally, for the independent DMRS, a timeslot in which the independent DMRS is located is used to transmit only the independent DMRS. For the combination of the DMRS and the uplink data, when the time domain location of the at least one DMRS is located before the timeslot of the PUSCH or when the time domain location of the at least one DMRS is located after the timeslot of the PUSCH, a timeslot in which the at least one DMRS is located is used to transmit only the at least one DMRS.

Optionally, the timeslot in which the independent DMRS is located or a timeslot in which the combination of the DMRS and the uplink data is located may also be used to transmit the uplink data. For details, refer to FIG. 8 provided above.

For the case 3 of the sending location information of the combination of the DMRS and the uplink data, a feasible implementation manner is that: the configuration indication further includes a mapping indication, where the mapping indication is used to instruct the UE to replace the at least one piece of uplink data with the at least one DMRS and map the at least one piece of uplink data to another frequency-time resource location.

Figure 15:
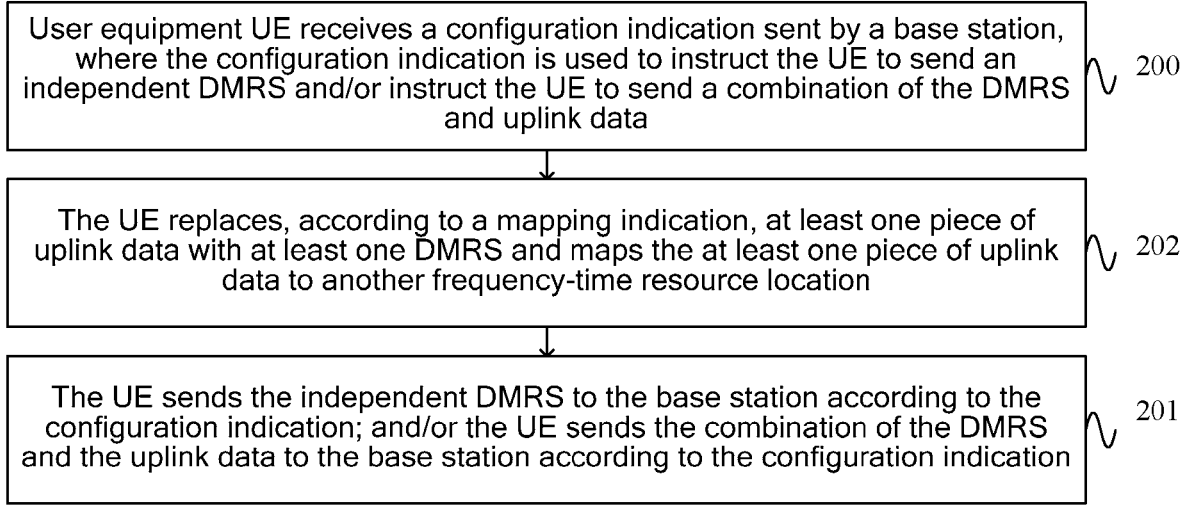
FIG. 15 is a schematic flowchart of another demodulation reference signal transmission method according to an embodiment of the present invention.

Further, based on FIG. 14, FIG. 15 is a schematic flowchart of another demodulation reference signal transmission method according to an embodiment of the present invention. Referring to FIG. 15, before step 201, the method further includes:

Step 202: The UE replaces, according to a mapping indication, at least one piece of uplink data with at least one DMRS and maps the at least one piece of uplink data to another frequency-time resource location.

Figure 16:
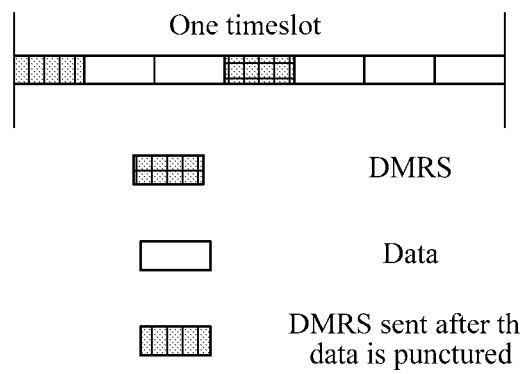
FIG. 16 is a schematic sending diagram of a physical channel after uplink data is replaced based on a mapping indication.

FIG. 16 is a schematic sending diagram of a physical channel after uplink data is replaced based on a mapping indication. At least one DMRS is not extended outward, but in a timeslot in which the uplink data is sent, a time-frequency resource location of at least one piece of the uplink data is given to the at least one DMRS for sending. The uplink data may be replaced via being punctured, or the uplink data may be mapped to other time-frequency resource locations. Referring to FIG. 16, a timeslot of a PUSCH includes an added DMRS, uplink data, and an original DMRS in the PUSCH.

Optionally, the configuration indication is a DCI indication of a PDCCH, or a MAC CE indication, or an RRC signaling indication.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An apparatus, comprising:
   a non-transitory memory; and
   a processor coupled to the memory and configured to:
   send a configuration indication to user equipment (UE), wherein the configuration indication instructs the UE to send an independent demodulation reference signal (DMRS), and wherein the independent DMRS does not depend on uplink data;
   send location information of the independent DMRS and/or send location information of the combination of the independent DMRS and uplink data; wherein the sending location information indicates that a time domain location of the independent DMRS is located before the timeslot of a physical uplink shared channel (PUSCH), or indicates that a time domain location of the independent DMRS is located after the timeslot of the PUSCH, or indicates that the time domain location of the independent DMRS is located within the timeslot of the PUSCH; and
   receive the independent DMRS sent by the UE.

2. The apparatus according to claim 1, wherein when the time domain location of the at least one DMRS is located before the timeslot of the PUSCH or when the time domain location of the at least one DMRS is located after the timeslot of the PUSCH, a timeslot in which the at least one DMRS is located transmits only the at least one DMRS.

3. The apparatus according to claim 1, wherein a timeslot in which the independent DMRS is located transmits only the independent DMRS.

4. The apparatus according to claim 1, wherein the configuration indication further comprises a mapping indication, wherein
the mapping indication instructs the UE to replace the at least one piece of uplink data with the at least one DMRS and map the at least one piece of uplink data to another frequency-time resource location.

5. The apparatus according to claim 1, wherein the configuration indication is a downlink control information (DCI) indication of a PDCCH, or a media access control control element (MAC CE) indication, or a radio resource control (RRC) signaling indication.

6. An apparatus, comprising:
a non-transitory memory; and
a processor coupled to the memory and configured to:
receive a configuration indication sent by a base station, wherein the configuration indication instructs a user equipment (UE) to send an independent demodulation reference signal (DMRS), and wherein the independent DMRS does not need to depend on uplink data; wherein the configuration indication further comprises sending location information of the independent DMRS and/or sending location information of the combination of the independent DMRS and uplink data and wherein the sending location information of the independent DMRS indicates that a time domain location of the independent DMRS is located before the timeslot of the PUSCH, or indicates that a time domain location of the independent DMRS is located after the timeslot of the PUSCH; and
send the independent DMRS to the base station according to the configuration indication.

7. The apparatus according to claim 6, wherein the processor is further configured to:
before sending the combination of the independent DMRS and the uplink data to the base station according to the configuration indication, replace, according to a mapping indication, the at least one piece of uplink data with the at least one DMRS and map the at least one piece of uplink data to another frequency-time resource location, wherein when the sending location information of the combination of the independent DMRS and the uplink data indicates that the time domain location of the at least one DMRS is located within the timeslot of the PUSCH, the configuration indication further comprises the mapping indication.

8. The apparatus according to claim 6, wherein the configuration indication is a downlink control information (DCI) indication of a PDCCH, or a media access control control element (MAC CE) indication, or a radio resource control (RRC) signaling indication.

9. A demodulation reference signal transmission method, comprising:

receiving, by user equipment UE, a configuration indication sent by a base station, wherein the configuration indication instructs the UE to send an independent demodulation reference signal (DMRS), and wherein the independent DMRS does not need to depend on uplink data, wherein the configuration indication further comprises sending location information of the independent DMRS and/or sending location information of the combination of the independent DMRS and uplink data and wherein the sending location information of the independent DMRS indicates that a time domain location of the independent DMRS is located before the timeslot of the PUSCH, or indicates that a time domain location of the independent DMRS is located after the timeslot of the PUSCH, or indicates that the time domain location of the at least one DMRS is located within the timeslot of the PUSCH; and
sending, by the UE, the independent DMRS to the base station according to the configuration indication.

10. The method according to claim 9, wherein the combination of the independent DMRS and the uplink data comprises at least one DMRS and at least one piece of uplink data, wherein the at least one piece of uplink data is located within a timeslot of a physical uplink shared channel (PUSCH).

11. The method according to claim 9, wherein the configuration indication further comprises a mapping indication, and
before the sending, by the UE, the combination of the independent DMRS and the uplink data to the base station according to the configuration indication, the method further comprises:
replacing, by the UE according to the mapping indication, the at least one piece of uplink data with the at least one DMRS and mapping the at least one piece of uplink data to another frequency-time resource location.

12. The method according to claim 9, wherein the configuration indication is a downlink control information (DCI) indication of a PDCCH, or a media access control control element (MAC CE) indication, or a radio resource control (RRC) signaling indication.

13. A demodulation reference signal transmission method performed by a base station, wherein the method comprises, before scheduling a user equipment (UE) to perform a transmission on a Physical Uplink Shared Channel (PUSCH):
sending a configuration indication to the UE, wherein the configuration indication is used to instruct the UE to send an demodulation reference signal (DMRS), wherein the independent DMRS does not depend on uplink data, wherein the configuration indication further comprises sending location information of the DMRS and wherein the sending location information of the DMRS indicates that a time domain location of the DMRS is located before the timeslot of a PUSCH, or indicates that a time domain location of the DMRS is located after the timeslot of the PUSCH; and
receiving the DMRS in a time slot sent by the UE.

* * * * *